(12) United States Patent  
Fink et al.

(10) Patent No.: US 10,722,077 B2  
(45) Date of Patent: Jul. 28, 2020

(54) COOKING UTENSIL FOR SECURING A FOOD ARTICLE OVER A HEAT SOURCE

(71) Applicant: FYNX, LLC, Mohnton, PA (US)

(72) Inventors: Jeffrey William Fink, Mohnton, PA (US); David Adam Fink, Dallastown, PA (US)

(73) Assignee: FYNX, LLC, Mohnton, PA (US)

( * ) Notice: Subject to any disclaimer, the term of this patent is extended or adjusted under 35 U.S.C. 154(b) by 460 days.

(21) Appl. No.: 15/421,791

(22) Filed: Feb. 1, 2017

(65) Prior Publication Data

US 2017/0224171 A1  Aug. 10, 2017

Related U.S. Application Data

(60) Provisional application No. 62/293,729, filed on Feb. 10, 2016.

(51) Int. Cl.
| | |
|---|---|
| *A47J 43/18* | (2006.01) |
| *A47J 33/00* | (2006.01) |
| *A47J 43/28* | (2006.01) |

(52) U.S. Cl.
CPC .............. *A47J 43/18* (2013.01); *A47J 33/00* (2013.01); *A47J 43/28* (2013.01)

(58) Field of Classification Search
None
See application file for complete search history.

(56) References Cited

U.S. PATENT DOCUMENTS

| | | | | |
|---|---|---|---|---|
| 4,393,757 A | * | 7/1983 | Welsh ................... | A47J 37/101 99/369 |
| 5,775,207 A | * | 7/1998 | Warren ................. | A47J 43/283 99/394 |
| 6,065,391 A | * | 5/2000 | Archard ................ | A47J 43/283 30/322 |
| 6,945,161 B1 | * | 9/2005 | Battaglia ............. | A47J 37/0694 211/181.1 |
| 2014/0060341 A1 | * | 3/2014 | Runstedler .............. | A47J 43/18 99/419 |
| 2016/0135642 A1 | * | 5/2016 | Rose ..................... | A47J 37/049 99/419 |

* cited by examiner

*Primary Examiner* — Ibrahime A Abraham  
*Assistant Examiner* — Elizabeth M Sims  
(74) *Attorney, Agent, or Firm* — McNees Wallace & Nurick LLC

(57) ABSTRACT

A cooking utensil for securing a food article over a heat source, including an elongate member extending to a fork head, the fork head comprising a first segment having a generally circular portion, the first segment extending to a second segment having at least two prongs.

20 Claims, 3 Drawing Sheets

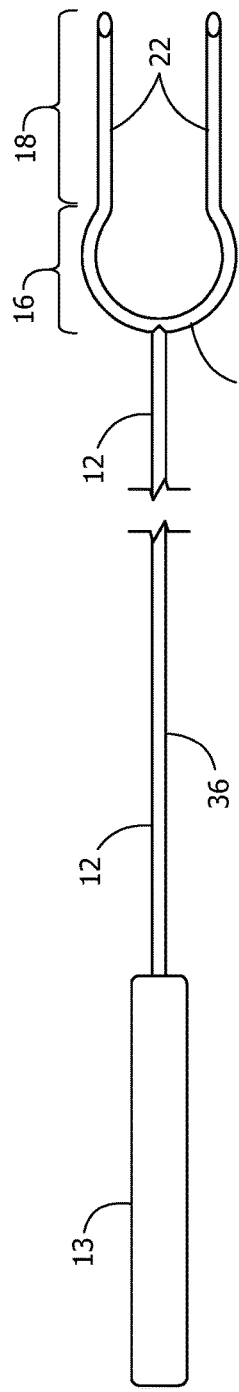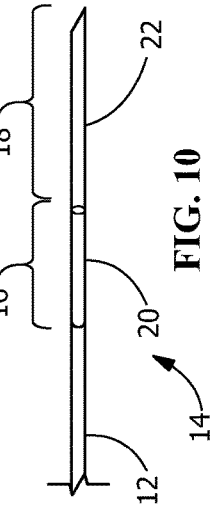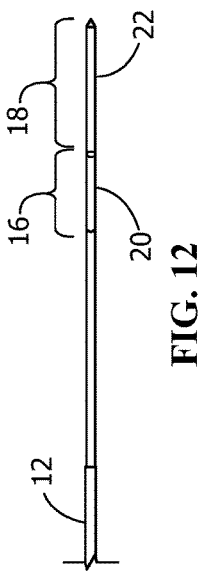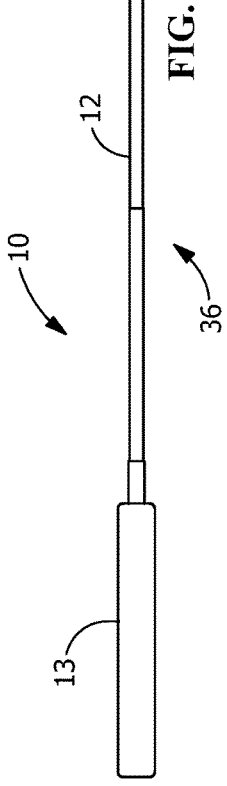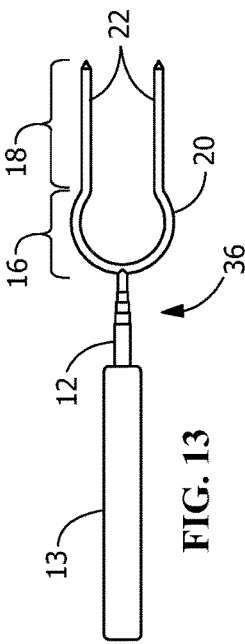
FIG. 9
FIG. 10
FIG. 11
FIG. 12
FIG. 13

COOKING UTENSIL FOR SECURING A FOOD ARTICLE OVER A HEAT SOURCE

FIELD OF THE INVENTION

The present invention is directed to a cooking utensil. More particularly, the present invention is directed to a cooking utensil for securing a food article over a heat source.

BACKGROUND OF THE INVENTION

Cooking or roasting foods over a heating source, such as a campfire presents challenges for traditional cooking utensils, such as a stick with a sharpened end or a roasting fork. Certain campfire foods, such as potatoes or corn on the cob are heavy and generally unsuitable for cooking with such utensils, as they may slide off the sharpened end of roasting fork into the campfire. While these food items may be wrapped in aluminum foil and placed directly in the campfire coals, removal can pose safety hazards, and the food items cannot be visually monitored during roasting. Also, non-traditional campfire foods, such as burritos or "campfire cones" cannot be accommodated by such cooking utensils.

There is a need in the art for a multipurpose cooking utensil that can secure a larger variety of foods over a heat source.

BRIEF DESCRIPTION OF THE INVENTION

In an exemplary embodiment, a cooking utensil for securing a food article over a heat source includes an elongate member extending to a fork head, the fork head including a first segment having a generally circular portion, the first segment extending to a second segment having at least two prongs.

In another exemplary embodiment, a cooking utensil for securing a food article over a heat source includes an elongate member extending to a fork head, the fork head comprising a first segment having a generally circular portion, the first segment extending to a second segment having at least two prongs generally parallel to each other. The at least two prongs subtend a first angle from the first segment sufficient to create a wedge effect for securing the food article therebetween.

In another exemplary embodiment, a cooking utensil for securing a food article over a heat source includes an elongate member extending to a fork head, the fork head comprising a first segment having a generally circular portion, the first segment extending to a second segment having at least two prongs generally parallel to each other. The at least two prongs subtend a first angle from the first segment sufficient to create a wedge effect for securing the food article therebetween. In response to the at least two prongs being positioned at least partially vertically above the first segment, the at least two prongs subtend a second angle vertically above a horizontal plane, thereby preventing a food article supported by the at least two prongs from sliding off of the at least two prongs by virtue of gravity.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 9 is a plan view of an exemplary cooking utensil.

FIG. 10 is an elevation view of a portion of the cooking utensil of FIG. 9.

FIG. 11 is a plan view of an exemplary cooking utensil.

FIG. 12 is an elevation view of a portion of the cooking utensil of FIG. 11.

FIG. 13 is a plan view of the cooking utensil of FIG. 11 in a retracted position.

Wherever possible, the same reference numbers will be used throughout the drawings to represent the same parts.

DETAILED DESCRIPTION OF THE INVENTION

As shown in the accompanying drawings and disclosure, the invention is an improvement over for a traditional two-pronged fire roasting fork. One aspect of the invention is to add features to increase the functionality of a traditional roasting fork by providing additional versatility and flexibility to cook a variety of foods. Another aspect of this invention is the ability of the fork head to roast non-traditional campfire foods over an open fire heat source. A further aspect of the invention is to increase the safety and convenience compared to using a forward-facing two pronged cooking utensil.

Figure 1:
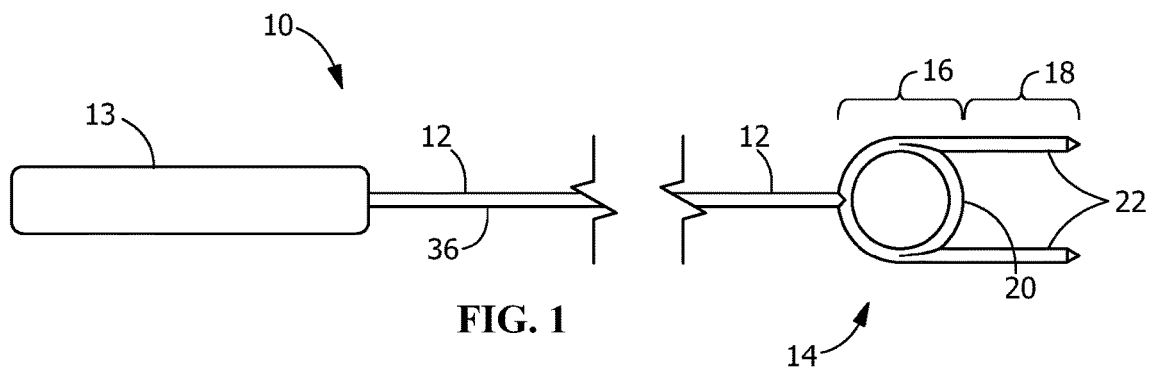
FIG. 1 is a plan view of an exemplary cooking utensil.
Figure 2:
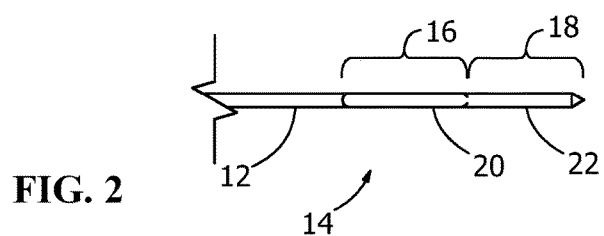
FIG. 2 is an elevation view of a portion of the cooking utensil of FIG. 1.

As shown in FIGS. 1 and 2, as well as FIGS. 9 and 10, cooking utensil 10 includes an elongate member 12 extending to a first segment 16 and then extending to a second segment 18. Collectively, first segment 16 and second segment 18 comprise a fork head 14. Cooking utensil 10 can be constructed of metal or other suitable material or a combination thereof. In one embodiment, one end of member 12 opposite first segment 16 may include a handle 13 constructed of wood or other suitable non-thermal conducting material. First segment 16 includes a generally circular portion 20. Second segment 18 includes at least two prongs 22. In one embodiment, prongs 22 are generally parallel to each other. As shown in FIG. 2, which is an elevation view of a portion of utensil 10 of FIG. 1, as well as FIG. 10, which is an elevation view of a portion of utensil 10 of FIG. 9, member 12, first segment 16, including circular portion 20 and second segment 18 are generally coplanar. In one embodiment, such as shown in FIGS. 11 and 12, it is appreciated that member 12 can include a telescoping feature 36, such as similar to a radio antenna, wherein the length of member 12 can be lengthened or extended during use, as desired, and shortened or retracted, such as shown in FIG. 13, for ease of handling/storage. As shown in FIG. 13, telescoping feature 36 includes five sections. In one embodiment, the number of telescoping feature can be different than five sections. Prongs 22 can be used to cook typical campfire foods such as hot dogs, sausages, marshmallows, kebabs, etc.

In an exemplary, embodiment, such as for FIG. 9, which is not intended to be limiting, the utensil is 41 inches in length, the handle is 6.5 inches long, the elongate member is 29.5 inches long and 0.22 inches in diameter, the prongs are 0.06 inches in diameter, the generally circular portion is 1.9 inches in diameter, and the length of the fork head is 5 inches. It is to be understood that each of these dimensions and profiles (e.g., circular/non-circular) can be different from this embodiment or any of the embodiments, depending upon the application, e.g., the types and sizes of the food articles being cooked.

In one embodiment, elongate member 12 can be secured to fork head 14, such as by welding. In one embodiment, circular portion 20 can be secured to prongs 22, such as by welding. In one embodiment, fork head 14 can be of unitary or one-piece construction. In one embodiment, fork head 14 and elongate member 12 can be of unitary or one-piece construction, such as by casting or other manufacturing technique. It is to be understood that any method of manufacture that yields the arrangement of the utensil is contemplated by the present invention.

Figure 3:
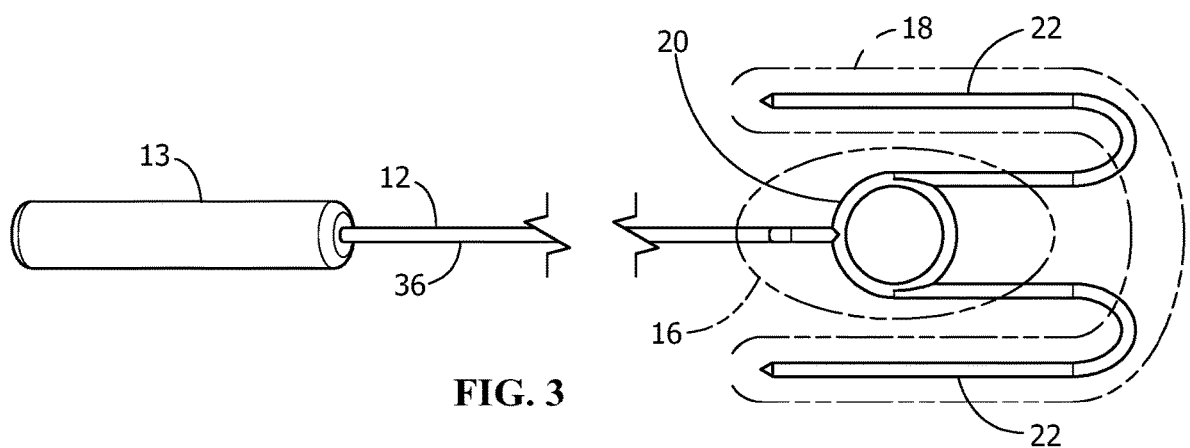
FIG. 3 is a plan view of an exemplary cooking utensil.
Figure 4:
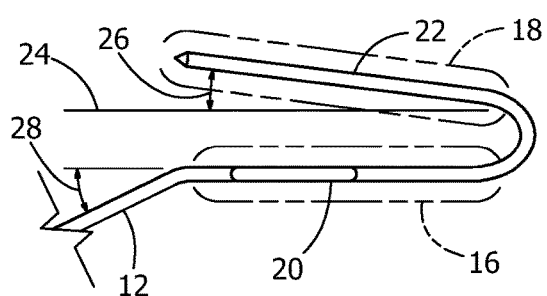
FIG. 4 is an elevation view of a portion of the cooking utensil of FIG. 3.
Figure 7:
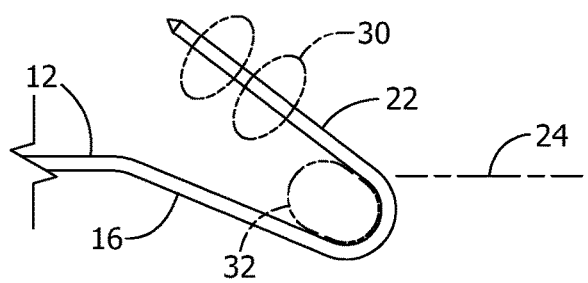
FIG. 7 is an elevation view of an exemplary fork head securing food articles.

As shown in FIGS. 3 and 4, a horizontal plane 24 is parallel to first segment 16. Prongs 22 and horizontal plane 24 subtend an acute angle 26 therebetween. As a result, prongs 22 and first segment 16 also subtend an acute angle 26 therebetween. Angle 26 is of sufficient magnitude to create a "wedge effect" for securing a food or food article 32 (FIG. 7) between prongs 22 and first segment 16. In one embodiment, angle 26 is between 5 and 30 degrees, between 10 and 25 degrees, between 12 and 20 degrees, 15 degrees, and any sub-combination therebetween. As a result of this wedge effect, in which a compressive force is exerted by prongs 22 and first segment 16 against a food article when the food article is sufficiently directed the junction between prongs 22 and first segment 16 such that the uncompressed thickness of the food article is greater than spacing between the prongs and the first segment, the larger and heavier food types such as burritos, tacos, corn on the cob, potatoes, etc. can now be secured in an elevated position by the utensil over an open flame or heat source without needing to place the food article in direct contact with the fire or heat source and help to minimize the chances of burning the food articles. In addition, as a result of the exposed, sharpened ends of prongs 22 facing the "cook" holding handle 13, safety is enhanced as there is a reduced tendency for inadvertent injury from the exposed ends of the prongs 22.

As further shown in FIG. 4, member 12 and first segment 16 subtend an acute angle 28 therebetween. In one embodiment, angle 28 is between 5 and 30 degrees, between 10 and 25 degrees, 12 degrees, 15 degrees and any sub-combination therebetween. As a result of angle 28, such as shown for example in FIG. 7, in response to prongs 22 being positioned at least partially vertically above first segment 16, prongs 22 subtend an angle vertically above horizontal plane 24, (similar to, but larger in magnitude than angle 26 of FIG. 4, as a cook holding member 12 would presumably be positioned vertically above the heat source or flame, such that member 12 is positioned at least parallel to horizontal plane 24, and most likely angled vertically above horizontal plane 24) thereby preventing a food article 30, such as kebabs supported by, i.e., skewers, by prongs 22 from sliding off of the prongs by virtue of gravity. That is, by this arrangement, an affirmative act by the cook is required to either manually remove the food articles from prongs 22, or to re-orient prongs 22 such that the prongs are positioned at least partially vertically beneath the first segment 16.

Figure 8:
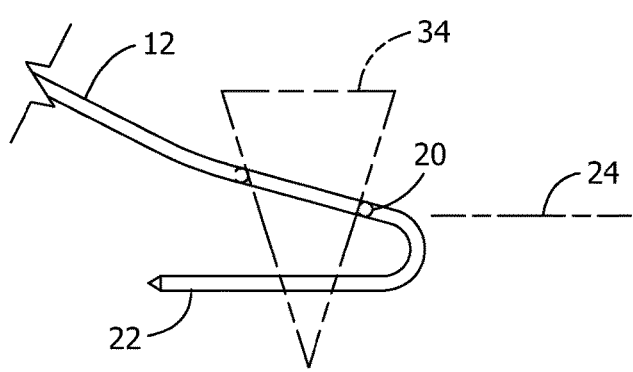
FIG. 8 is an elevation view of an exemplary fork head securing a food article.

As shown in FIG. 8, food articles having a circular cross section, such as circular conical shaped food article 34 can be received in generally circular portion 20 for cooking in an elevated position over a heat source. For example, campfire cones are sugar or waffle cone stuffed with marshmallows, chocolate, fruit, nuts, granola, coconut, candy or whatever favorite snack food item that is placed into the cone. Prior to circular portion 20 of the present utensil, such cones were wrapped in aluminum foil and set directly on the hot embers of the fire, with the associated disadvantages previously discussed, as well as an increased chance of burning the cone or its contents, resulting in an undesirable taste. It is to be understood that different sized circular conical shaped food articles can be accommodated by circular portion 20. In one embodiment, portion 20 can have a non-circular profile, such as for accommodating a non-circular food article.

Figure 5:
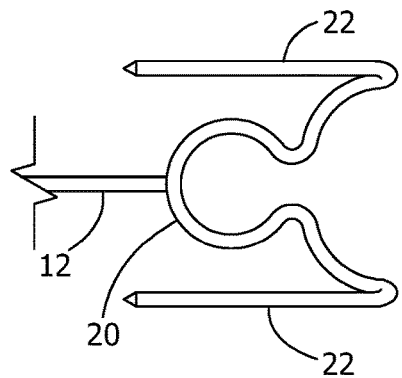
FIG. 5 is a plan view of a portion of an exemplary fork head.
Figure 6:
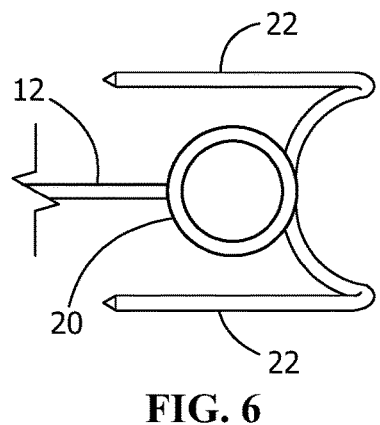
FIG. 6 is a plan view of a portion of an exemplary fork head.

FIGS. 5 and 6 are provided to show exemplary arrangements of circular portion 20. It is to be understood the many alternate arrangements are possible and are within the scope of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooking utensil for securing a food article over a heat source, comprising:
   an elongate member having a first end extending to and affixed to a fork head at a second end of the elongate member opposite the first end, the fork head comprising a first segment having a generally circular portion, the first segment extending to a second segment having at least two prongs or forming a portion of the at least two prongs, the generally circular portion affixed to the at least two prongs or the generally circular portion and the at least two prongs being one-piece;
   wherein the generally circular portion is positioned between the at least two prongs;
   wherein the at least two prongs are set apart at a width greater than a width of the generally circular portion, and endpoints of the at least two prongs are positioned between the first end of the elongate member and the generally circular portion;
   wherein the generally circular portion is adapted to receive, and support and secure a circular conical shaped food article over the heat source, the circular conical shaped food article having a longitudinal axis, the longitudinal axis being maintained in a vertical orientation, at least four opposed portions of a peripheral surface of the circular conical shaped food article contacting corresponding opposed portions of the generally circular portion, an end of the elongate member opposite the fork head being remote from the heat source.

2. The cooking utensil of claim 1, wherein the at least two prongs are generally parallel to each other.

3. The cooking utensil of claim 2, wherein the elongate member and the first segment subtend a first angle between 5 and 20 degrees.

4. The cooking utensil of claim 2, wherein the elongate member and the first segment subtend a first angle of 15 degrees.

5. The cooking utensil of claim 2, wherein the at least two prongs subtend a first angle from the first segment sufficient to create a wedge effect for securing the food article therebetween.

6. The cooking utensil of claim 5, wherein the first angle is between 5 and 30 degrees.

7. The cooking utensil of claim 5, wherein the first angle is 15 degrees.

8. The cooking utensil of claim 1, wherein the elongate member has a telescoping feature.

9. A cooking utensil for securing a food article over a heat source, comprising:
an elongate member having a first end extending to and affixed to a fork head at a second end of the elongate member opposite the first end, the fork head comprising a first segment having a generally circular portion, the first segment extending to a second segment having at least two prongs or forming a portion of the at least two prongs, the generally circular portion affixed to the at least two prongs or the generally circular portion and the at least two prongs being one-piece;
wherein the at least two prongs subtend a first angle from the first segment sufficient to create a wedge effect for securing the food article therebetween;
wherein the generally circular portion is positioned between the at least two prongs;
wherein the at least two prongs are set apart at a width greater than a width of the generally circular portion, and endpoints of the at least two prongs are positioned between the first end of the elongate member and the generally circular portion;
wherein the generally circular portion is adapted to receive, and support and secure a circular conical shaped food article over the heat source, the circular conical shaped food article having a longitudinal axis, the longitudinal axis being maintained in a vertical orientation, at least four opposed portions of a peripheral surface of the circular conical shaped food article contacting corresponding opposed portions of the generally circular portion, an end of the elongate member opposite the fork head being remote from the heat source.

10. The cooking utensil of claim 9, wherein the first angle is between 5 and 30 degrees.

11. The cooking utensil of claim 9, wherein the first angle is 15 degrees.

12. The cooking utensil of claim 9, wherein the elongate member and the first segment subtend a second angle between 5 and 20 degrees.

13. The cooking utensil of claim 9, wherein the elongate member and the first segment subtend a second angle of 15 degrees.

14. The cooking utensil of claim 9, wherein in response to the at least two prongs being positioned at least partially vertically above the first segment, the at least two prongs subtend a second angle vertically above a horizontal plane, thereby preventing a food article supported by the at least two prongs from sliding off of the at least two prongs by virtue of gravity.

15. A cooking utensil for securing a food article over a heat source, comprising:
an elongate member having a first end extending to and affixed to a fork head at a second end of the elongate member opposite the first end, the fork head comprising a first segment having a generally circular portion, the first segment extending to a second segment having at least two prongs or forming a portion of the at least two prongs, the generally circular portion affixed to the at least two prongs or the generally circular portion and the at least two prongs being one-piece, the at least two prongs being generally parallel to each other;
wherein the at least two prongs subtend a first angle from the first segment sufficient to create a wedge effect for securing the food article therebetween;
wherein in response to the at least two prongs being positioned at least partially vertically above the first segment, the at least two prongs subtend a second angle vertically above a horizontal plane, thereby preventing a food article supported by the at least two prongs from sliding off of the at least two prongs by virtue of gravity;
wherein the generally circular portion is positioned between the at least two prongs;
wherein the at least two prongs are set apart at a width greater than a width of the generally circular portion, and endpoints of the at least two prongs are positioned between the first end of the elongate member and the generally circular portion;
wherein the generally circular portion is adapted to receive, and support and secure a circular conical shaped food article over the heat source, the circular conical shaped food article having a longitudinal axis, the longitudinal axis being maintained in a vertical orientation, at least four opposed portions of a peripheral surface of the circular conical shaped food article contacting corresponding opposed portions of the generally circular portion, an end of the elongate member opposite the fork head being remote from the heat source.

16. The cooking utensil of claim 15, wherein the first angle is between 5 and 30 degrees.

17. The cooking utensil of claim 15, wherein the first angle is 15 degrees.

18. The cooking utensil of claim 15, wherein the elongate member and the first segment subtend a third angle between 5 and 20 degrees.

19. The cooking utensil of claim 15, wherein the elongate member and the first segment subtend a third angle of 15 degrees.

20. The cooking utensil of claim 15, wherein the elongate member has a telescoping feature.

* * * * *